(12) United States Patent
Penna et al.

(10) Patent No.: US 11,109,630 B2
(45) Date of Patent: Sep. 7, 2021

(54) RIDE SHARE HELMET SAFETY COMPLIANCE

(71) Applicants: Andreas Penna, Battle Creek, MI (US); Adam Kaye, Fort Lauderdale, FL (US)

(72) Inventors: Andreas Penna, Battle Creek, MI (US); Adam Kaye, Fort Lauderdale, FL (US)

( * ) Notice: Subject to any disclaimer, the term of this patent is extended or adjusted under 35 U.S.C. 154(b) by 0 days.

(21) Appl. No.: 17/092,538

(22) Filed: Nov. 9, 2020

(65) Prior Publication Data
US 2021/0161238 A1    Jun. 3, 2021

Related U.S. Application Data

(63) Continuation-in-part of application No. PCT/US2019/030351, filed on May 2, 2019.
(Continued)

(51) Int. Cl.
| | |
|---|---|
| *A42B 3/04* | (2006.01) |
| *G06Q 50/30* | (2012.01) |
| *A42B 3/30* | (2006.01) |
| *G07C 9/00* | (2020.01) |
| *B62J 11/24* | (2020.01) |

(Continued)

(52) U.S. Cl.
CPC .............. *A42B 3/0413* (2013.01); *A42B 3/30* (2013.01); *A42B 3/322* (2013.01); *A42B 3/324* (2013.01); *B62J 11/24* (2020.02); *G06F 21/32* (2013.01); *G06Q 30/018* (2013.01); *G06Q 50/30* (2013.01); *G07C 9/00182* (2013.01); *G07C 9/00309* (2013.01); *G07C 9/00896* (2013.01); *G07C 2009/00539* (2013.01)

(58) Field of Classification Search
CPC ......... A42B 3/0413; A42B 3/30; A42B 3/322; A42B 3/324; B62J 11/24; G06F 21/32; G06Q 30/018; G06Q 50/30; G07C 9/00182; G07C 9/00309; G07C 9/00896; G07C 2009/00539
See application file for complete search history.

(56) References Cited

U.S. PATENT DOCUMENTS

| | | | |
|---|---|---|---|
| 3,896,643 A | * | 7/1975 | Kawakami ............... B62J 11/24 70/59 |
| 9,642,409 B2 | | 5/2017 | Roesler |

(Continued)

FOREIGN PATENT DOCUMENTS

| | | |
|---|---|---|
| CN | 107767500 | 3/2018 |
| CN | 110929608 A * | 3/2020 |

OTHER PUBLICATIONS

International Search Report dated Sep. 17, 2019, for International Application No. PCT/US2019/030351.

(Continued)

*Primary Examiner* — Yong Hang Jiang
(74) *Attorney, Agent, or Firm* — FisherBroyles LLP (57) ABSTRACT

Embodiments of the present disclosure relate to helmet safety compliance systems for use in personal transportation ride-share systems. A rider safety compliance system, may include a personal transport upon which a user can be transported, a physical lock mechanism securely mounted on the personal transport and mechanically adapted to lock and secure a helmet, and a processor adapted to release the helmet from the physical lock mechanism as a pre-determined action for allowing the user to activate the personal transport.

26 Claims, 5 Drawing Sheets

Related U.S. Application Data

(60) Provisional application No. 62/669,062, filed on May 9, 2018.

(51) Int. Cl.
  *G06Q 30/00* (2012.01)
  *A42B 3/32* (2006.01)
  *G06F 21/32* (2013.01)

(56) References Cited

U.S. PATENT DOCUMENTS

| | | | |
|---|---|---|---|
| 2013/0093585 A1* | 4/2013 | Ambani | A42B 3/306 |
| | | | 340/475 |
| 2014/0379124 A1 | 12/2014 | Dallaire | |
| 2016/0321771 A1 | 11/2016 | Liu | |
| 2017/0119078 A1 | 5/2017 | Chen | |
| 2017/0253289 A1 | 9/2017 | Critzer | |
| 2018/0007994 A1* | 1/2018 | Boesen | A42B 3/30 |
| 2019/0375427 A1* | 12/2019 | Whitt | B60W 10/18 |

OTHER PUBLICATIONS

Written Opinion of the international Searching Authority dated Sep. 17, 2019, for International Application No. PCT/US2019/030351.

* cited by examiner

RIDE SHARE HELMET SAFETY COMPLIANCE

CLAIM TO PRIORITY

This application is a continuation-in-part of International Application No. PCT/US2019/030351, filed May 2, 2019, which claims the benefit of U.S. provisional application 62/669,062, filed May 9, 2018, each of which are hereby incorporated by reference in its entirety.

BACKGROUND

Field

This disclosure relates to ensuring safety compliance regarding helmet use in ride shares.

Description of the Related Art

Personal transportation options in ride sharing environments have a number of challenges. Some personal transportation involves using devices that should only be operated while wearing a helmet. Delivering helmets in such systems is a challenge and could be improved.

SUMMARY

Aspects of the present disclosure relate to safety compliance in ride-share models.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The disclosure and the following detailed description of certain embodiments thereof may be understood by reference to the following figures.

DETAILED DESCRIPTION

The personal transportation market has become a very important part of local travel. It fills a gap for a rider or user traveling a relatively short distance in a city. There are two primary business modules for the delivery of personal transportation systems delivery for the bikes and scooters. The first involves a dedicated dock where the personal transport (e.g. a bike) is locked and charged. In this model, a user needs to go to the docking area to rent the personal transport and then drop off and re-lock the bike at another docking station near the user's destination. The second involves a dockless system. The personal transport (e.g. bikes or scooters) are charged and then distributed in areas around the city at night. Users find the personal transports via GPS through a phone application or just find one physically near them. The phone application ("app") is used to unlock the system and then the rider may leave the bike or scooter in a safe place wherever they want at their destination. The inventors have discovered a serious problem with both models, but in particular the second model. The inventors learned that there is no convenient way to provide helmets or other safety equipment or safety compliance systems with the bikes or scooters because they are constantly being dropped off at different locations. The inventors have developed a number of systems to resolve this problem.

In embodiments, a personal transport has a locking mechanism that is permanently mounted such that a helmet with a mating locking mechanism can be attached and locked. The locking mechanism acts like a key to activate the personal transport. The user walks up to the personal transport and activates an unlock process (e.g. on her phone through an app) and the helmet unlocks from the personal transport. Once the helmet is unlocked or removed from the personal transport, the user may then be able to operate the personal transport. In embodiments, a further step may be required before the personal transport is activated. The helmet may be required to be mounted on the user's head. The helmet may have a sensor to detect that it has been mounted and/or secured to the user's head before activating the personal transport. Similarly, the personal transport or lock may contain a camera to detect a helmet is being worn, such as through a computer vision system. In another embodiment, the user may have to acknowledge that she is using the lockable helmet or another helmet (e.g. personal helmet) before the personal transport will activate. The acknowledgment may be done through the phone app or on the personal transport or helmet, for example.

In embodiments, the phone application may be used to find the location of a personal transport, activate the personal transport, unlock safety equipment on the personal transport, etc. There may be a user coordination process such as loading a code manually on the personal transport that was received by the user through the phone application or vice-versa. This coordination may also be automated between the user's phone application and the personal transport. For example, once the personal transport is in Bluetooth, or other protocol such as RFID or NFC, range, the user's phone and the personal transport may connect and interoperate. The interoperability may use the phone's security features such as providing a code to unlock, fingerprint to unlock, facial recognition to unlock, etc. For example, to unlock the helmet from the personal transport, the user may use the phone's facial recognition system, code input system, fingerprint recognition system, etc.

In embodiments, the personal transport may be unlocked without a phone application. For example, the personal transport may be connected to the Internet and the user may be pre-approved to take the personal transport. The personal transport may have a code, fingerprint, facial recognition or other security system arranged to recognize the user in accordance with the user's per-approved profile. Other mechanisms such as a device having a short-range communication protocol such as NFC or RFID.

Sensor systems in the personal transport, the user's phone, the helmet and/or other systems may be used to monitor the performance of the rider. The sensor systems may track the user's speed, compliance with laws, compliance with areas in which the personal transport is allowed to be used, etc. The sensor data may be used to generate a user performance history or profile. The profile may be used to provide feedback to the user, place the user in a category of rider, etc. The category may be used to effect insurance rates, fines, incentives, etc. for the user. The sensors could also detect impact or severity of said impact.

An aspect of the present disclosure provides a rider safety compliance system for the users of a personal transport. Personal transports tend to be designed for convenient inexpensive short trips. Many types of personal transports should only be ridden with a helmet as a safety device. This is because many personal transports move quickly but by their nature are not designed to protect the user's head in an accident. The need for a helmet gets more complicated in a sharing or rental model where the check-in and check-out processes for the personal transports are not supervised by people at the pick-up and drop-off points. It is much easier to provide a user with safety equipment in a more traditional rental model where bikes, for example, are picked up at a store because the service provider can be sure to offer the safety equipment. In the sharing model, where personal transports are scattered throughout an area, delivering safety equipment is a significant challenge. In embodiments, the personal transport safety compliance system involves providing a personal transport in a share model and including a helmet that is locked to the personal transport. The locking mechanism can be released by the user in order to activate the personal transport. The user may find the personal transport through an app on their phone, or other personal communication system, and then activate the personal transport. The activation may involve submitting a request through the app or the personal transport itself and then, following an agreement on the payment for the rental/share, the user may be directed to disconnect the helmet from the lock to continue. Once the user removes the helmet from the personal transport the activation process may continue to provide the user with access to an operational personal transport. The user may, as an alternative to removing the helmet, accept certain terms and conditions from the provider of the personal transport that permits the user to continue the activation process without taking the helmet.

Figure 3:
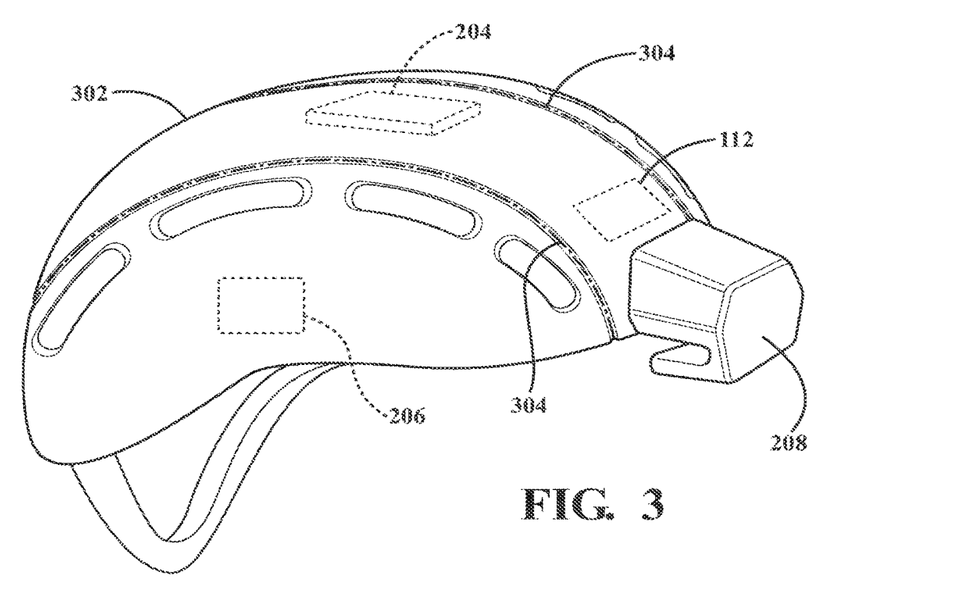
FIG. 3 depicts a foldable helmet.

In embodiments, the rider safety compliance system includes a processor in communication with a phone, wherein the phone has an application adapted to locate the personal transport, communicatively connect with the processor, and unlock the helmet to activate the personal transport for a ride. In embodiments, the application locates the personal transport through an electronic triangulation location of the personal transport and the phone. In embodiments, the helmet is a compactable or foldable helmet 302 that is compacted while stored in position on the personal transport and is unfolded to be worn by the user. The foldable helmet 302 may fold along any number of fold lines 304 or hinges. In embodiments, the helmet is not compactable. In embodiments, the helmet is adjustable such that it can be adjusted to fit different head sizes.

In embodiments, the rider safety compliance system may involve providing access to a shared or rented personal transport upon which a user can be transported where the personal transport has a physical lock mechanism securely mounted on the personal transport and mechanically adapted to lock and secure a helmet. The personal transport and/or lock may include a processor adapted to release the helmet from the lock mechanism, wherein the user controls the processor through a software platform that granted the user permission to activate the personal transport for temporary use. In embodiments, this provides a way for an owner of the personal transport to be sure that the user has access to a helmet. In embodiments, the locking and unlocking of the helmet may not be tracked for compliance with safety protocols. In embodiments, the locking provides the user with a helmet and it provides the owner with a way of understanding if the helmet has been returned to the personal transport. The lock may be programmed to provide the owner with information on the presence of the helmet. In embodiments, the user receives a personal use code to unlock the helmet. In embodiments, the user unlocks the helmet through a ride-share software application operating on a personal communication system of the user.

Figure 2:
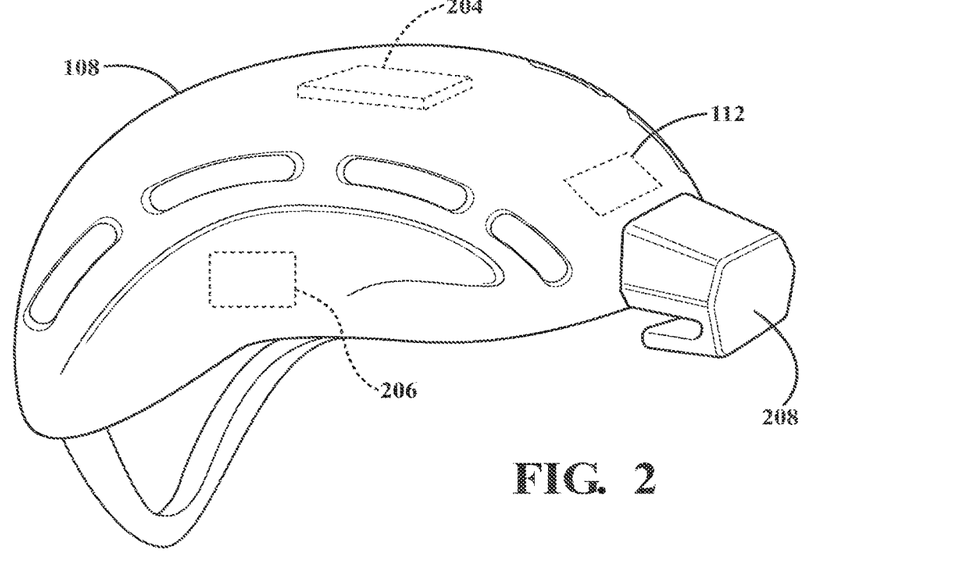
FIG. 2 illustrates a helmet with sensor system in accordance with the principles of the present disclosure.

In embodiments, the physical lock mechanism is on the helmet, as a helmet lock 208, and mechanically adapted to lock and secure the helmet to the personal transport. The helmet may include a processor adapted to release the helmet's lock mechanism from the personal transport, wherein the user controls the processor through a software platform that granted the user permission to activate the personal transport for temporary use.

Figure 1:
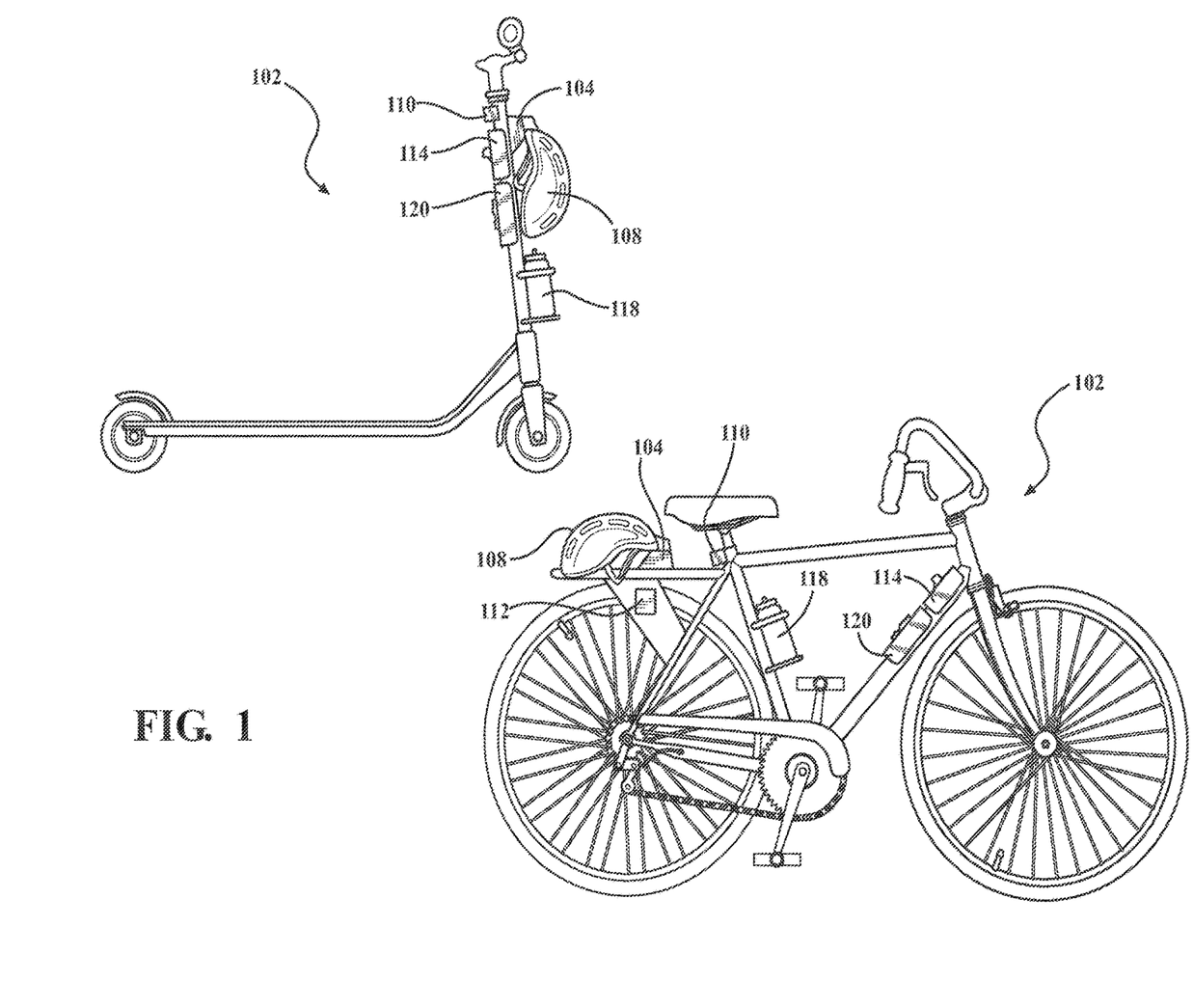
FIG. 1 illustrates a personal transport with a helmet system in accordance with the principles of the present disclosure.

FIG. 1 illustrates a personal transport 102 with a helmet mounting lock 104 and a mounted helmet 108. Two styles of personal transport are illustrated, a scooter type 102 at the top, and a bike type 102 at the bottom. A personal transport can be any type of device intended to move a person relatively short distances. Many personal transports are electrically driven devices that are either charged in a dock, charged in place, or removed and charged remotely. A personal transport may be a user operated device, user assisted operated device, autonomously operated device, etc.

A user may find and activate a personal transport through a user's personal communication device, such as a phone, watch, glasses, computer, laptop, tablet, personal assistant (e.g. Siri, Google Home, Amazon Alexa), etc.

A personal transport may be provided through a share model. The share model may be operated by a business that owns and/or is responsible for ownership of a number of personal transports. The business may strategically position the personal transports throughout an area (e.g. through a busy part of a city or town). The personal transports may be docked in charging/holding stations, dockless, etc. Users may then share or rent a personal transport by checking it out. This may be done through a personal communication device of the user, completed at the personal transport drop area through a separate system, through a user interface on the personal transport, etc. The user may find available personal transports near the user through an app on the user's personal communication device. The personal transports, or related devices, may include location systems (e.g. GPS) and the personal communication may also self-locate (e.g. with GPS) such that the user can obtain directions to the personal transports. Once the user arrives at the personal transport, the user can check it out by completing a check-out process. This provides the user with the personal transport for a limited possession period. During the possession period, the personal transport is essentially the responsibility of the user, through the sharing/renting terms and conditions, and the user is supposed to return the personal transport to the owner business at the end of the user's possession period.

Another aspect of the present disclosure relates to a rider safety compliance system for a personal transport that includes monitoring a user activity through a helmet sensor system. In embodiments, the compliance system includes a sensor system on a helmet. The sensor system is in communication with a processor on the helmet such that data acquired from the sensor system can be transmitted to another device. In embodiments, the sensor data is indicative that the user is wearing the helmet. Data indicative of the user wearing, wearing, properly or improperly wearing the helmet, etc. may be communicated to the personal transport, to the user's personal communication system, to a server system that is managing the share/rent process, etc. In embodiments, the system is adapted to activate the personal transport for riding by a user following receipt of sensor information that indicates that the helmet is being worn by the user. This may be considered a necessary compliance step in the check-out process, during the user's possession period, when operating the personal transport, when the motor in the personal transport is active, when the personal transport indicates that it is in use, etc. In embodiments, the user may be presented with an opt-out where the user acknowledges the risks associated with riding the personal transport without wearing a helmet, or elects to use the user's own helmet, etc. to continue the rideability during the user's possession period without using the helmet with the sensor system.

FIG. 2 illustrates a helmet 108 with a sensor system 204 and a processor 206. The sensor system 204 may be any type of sensor system adapted to detect whether the user is wearing the helmet 108. For example, the sensor system 204 may include an infrared sensor to detect the heat of the user's head, a proximity detector to detect a position of the user's head, an active energy emission system, a passive sensor system, a combination of sensors, etc. The processor 206 may be any type of computer processor adapted to receive data from the sensor system 204 and communicate the data to another device. For example, the processor may include a CPU, FPGA, microprocessor, DSP, etc. and it may communicate with the other device through a wireless or wired protocol. The wireless protocol may include a short-range protocol (e.g. Bluetooth, RFID, NFC), mid or long-range protocol (e.g. WiFi, cellular).

In embodiments, the sensor system may be adapted to be removably and replaceably mounted to the helmet by a user of a personal transport. This arrangement can be useful in a situation where the user elects to use her own helmet. This allows a user to unlock the personal transport in a way described herein with the helmet compliance system, however, the user gets to mount the sensor and processor on the user's own helmet. In embodiments, the sensor system is securely mounted on the personal transport in a location accessible to the user such that the user can remove the sensor system from the personal transport and secure the sensor system to the helmet. The sensor system may be locked on the personal transport and an unlocking process similar to the ones described herein with respect to the fully integrated helmet may be used to unlock and release the sensor system so the user can unlock it, mount it on her own helmet, and continue in the possession, check-in, or check-out processes. In embodiments, the sensor system is locked to the personal transport and the user unlocks the sensor for use through a user interface on the personal transport. In embodiments, the sensor system is locked to the personal transport and the user unlocks the sensor for use through a user interface on a phone.

Aspects of the present disclosure relate to a rider safety compliance system that monitors the sensor system while the personal transport is activated to monitor whether the user is wearing the helmet. This allows the owner of the personal transport to monitor whether the user is wearing the helmet in compliance with the ride share terms and conditions. In embodiments, the processor communicates data indicative of a helmet wearing status and the data is received at a server remote from the personal transport so it can be monitored, manipulated, stored and used. In embodiments, the data is used to generate a personal compliance profile of the user. The compliance profile may be used to determine how to regulate the personal transport for the user. For example, the personal transport's maximum capable speed may be reduced or regulated if the compliance profile indicates that the user has not worn the helmet in compliance with a standard. The personal transport may de-activate if the compliance profile indicates that the user has not worn the helmet in compliance with a standard. The data may also apply to future shares or rentals from the user because the personal profile, for example, may indicate that the user has been out of compliance in the past. Further, in embodiments, the processor may cause an alarm to activate (e.g. on the personal transport or helmet) in the event the data indicates that user is not wearing the helmet in compliance with the regulations or standards. In embodiments, the sensor system may be adapted to record data indicative of an impact of the helmet with an object.

Another aspect of the present disclosure relates to monitoring the riding behavior of a user of a shared or rented personal transport. In embodiments, a personal transport may have a sensor system adapted to track a performance of the personal transport as compared to a standard, wherein the sensor system is adapted to track a position of the personal transport as compared to a pre-defined area where compliant use has been determined, adherence of a use of the personal transport to rules of pathways defined by a municipality, compliance with acceptable practices of operating the personal transport.

Another aspect of the present disclosure relates to how the personal transport and/or share software system identifies the user as the approved user. As disclosed elsewhere herein, the user may have a user interface on a personal communication system (e.g. a phone) and that interface may facilitate access to the personal transport, helmet, and other features. In embodiments, the personal transport has a sensor system 110 that is adapted to recognize the user. The user's finger prints, facial features, personal code (e.g. permanent code provided by the share system that remains persistent while the user is signed up to the sharing platform, can be refreshed to get a new one upon user initiation, etc.), newly received personal code (e.g. a code set to the user through the personal communication app that can be used at a personal transport) may be accessible to the personal transport through the share-system. The personal biometric information may be stored at a server, for example, and the personal transport may have a sensor system adapted to be used by the user for verification. For example, if the user's facial features are stored at a server accessible by the personal transport, the personal transport may have a facial recognition sensor system to read the facial features of the user such that they can be compared to the stored features to obtain access to the ride. In embodiments, the rider personal recognition system includes a personal transport adapted with a biometric sensor, wherein the biometric sensor is pre-programmed with data indicative of a user to recognize the user based on interaction with the biometric sensor, wherein, upon user recognition based on the interaction, the personal transport activates for availability to ride.

In embodiments, the personal identification system (e.g. finger print, facial recognition, voice recognition) on the user's personal communication system (e.g. phone) may be used in concert with the ride-share system to obtain access to the personal transport. The user may, once prompted by the ride-share user interface, use the phone's verification sensor system to log into and/or access the personal transport.

Another aspect of the present disclosure relates to a situation where the user, of a personal transport in a ride-share/rental arrangement, either has his own helmet or decides he would rather not ride with a helmet and will assume the risks. In embodiments, the rider safely compliance system may include providing a personal transport upon which a user can be transported where the personal transport has a physical lock mechanism securely mounted on the personal transport and mechanically adapted to lock and secure a helmet. The system includes providing a user interface adapted to provide the user with information to activate the personal transport, the information comprising a verification step indicating that the user does or does not want the helmet released. In embodiments, a processor on the personal transport is adapted to release the helmet from the locking mechanism after the user verifies that the user wants the helmet released. In embodiments, the user interface requires that the user verify that the user will use the user's own helmet when riding the personal transport.

Another aspect of the present disclosure relates to confirming that a user has returned a helmet and/or reminding the user to return the helmet in a ride-share/rental system. In embodiments, a helmet return compliance system 112 includes a proximity detection system that monitors the helmet's proximity to a personal transport. The system may alert the user through the ride-share application that the user has taken the helmet outside of a normal use zone (e.g. a distance from the personal transport defined by the owner of the personal transport) for the helmet as indicated by the proximity detection system. In embodiments, the system (e.g. the personal transport, user interface, or helmet) includes an alarm that activates when the helmet is outside of the normal use zone. In embodiments, the system detects that the helmet is more than a greater than a predetermined distance from the personal transport the alarm is activated. In embodiments, the alarm is operable on a user's personal communication system (e.g. an alarm on the user's phone as controlled through the ride-share application). In embodiments, the alarm is in the helmet. In embodiments, the alarm is on the personal transport. In embodiments, the alarm will not activate if the personal transport has not been deactivated and returned to the possession of an owner of the personal transport. This can prevent frustration by the user in the event that they want to carry the helmet around while they are still in possession of the personal transport.

Another aspect of the present disclosure relates to helmet return compliance in a ride-share system. In embodiments, the ride-share personal transport is accessible through a user interface on a user's personal communication system. A helmet may be provided wherein the helmet is digitally assigned to the personal transport for tracking purposes. The return compliance system may be adapted to initiate a termination process for the user's possession period after the user submits information through the user interface that the user's ride is complete and the user is returning the personal transport. The return process may require that the helmet be replaced on the personal transport before the user's possession period will be terminated. In the event the helmet is not returned, the user may continue to be charged a rental fee because the personal transport may be considered out of service without the helmet. The user may be provided with an option to explain why the helmet could not be returned.

Another aspect of the present disclosure relates to maintaining a helmet in a ride-share system. If a helmet gets damaged in some way, it may no longer be compliant for use. The compliance may be measured by a government regulated standard, the owner's standard or otherwise. Helmet impact(s) can affect the helmet's ability for future head protection. In embodiments, the helmet includes an impact sensor and a processor. The processor may be adapted to communicate from the helmet when the helmet has suffered an impact, as indicated by impact data from the impact sensor. The processor may also be adapted to analyze the impact data and to decide if the helmet should be taken out of service because of potential damage to the helmet. The processor on the helmet may be in communication with other processors and the decision on helmet condition and compliance may be made at the helmet, personal transport, server system operating the ride-share, etc. In embodiments, if the helmet is to be taken out of service, a personal transport that is assigned for use with the helmet is also taken out of service until the helmet is repaired or replaced.

Another aspect of the present disclosure relates to an opt-out for the user. In embodiments, a personal transport is provided within a ride-share system and the personal transport comes with a helmet. The personal transport may be provided in a ride-sharing system where the personal transport is owned by a party and the user of the personal transport compensates the owner to use the personal transport for a period of time. The user may be provided access to the personal transport through a user interface. The user interface may provide the user with an acknowledgement indicating that the user has chosen not to use the helmet and has either assumed the risk of riding without the helmet or is using another helmet. In embodiments, the helmet is attached to the personal transport and the personal transport is adapted to not be activated until either the helmet is removed from the personal transport or until the personal transport receives the opt-out acknowledgement.

Another aspect of the present disclosure relates to providing users of a ride-sharing personal transport system with information about the types and sizes of helmets that are available with the personal transports. The user may be presented with a map indicating where personal transports are available. Each instance of a personal transport on the map may be accompanied with information about associated helmet(s). The map may contain information about the helmet that is attached to a personal transport. The map may provide guidance on where to pick up a helmet for use with the personal transport. In embodiments, the ride-sharing system has a software application operating on a personal communication system of a user (e.g. phone, watch) and the software application includes a user interface adapted to locate the personal communication system (e.g. GPS of the phone's location) and available personal transports in an area. The user interface further may provide information to the user about which of the available personal transports have helmets of a size and/or type. The user may also have stored a helmet size and/or type such that the user sees, possibly highlighted or exclusively, personal transports with his personal preference of helmet.

Because the personal transport and the protective gear is ordinarily used by multiple users and is ordinarily outside on the street, and, thus, in a dirty environment, the protective gear is subject to dirt and contamination. Accordingly, in embodiments, the disclosure relates to a sanitation device to facilitate hygienic use of the protective gear. The sanitation device may function in different ways, including, for example, by dispensing an antimicrobial material in the form of, for example, a wipe, spray, liquid or gel, or by dispensing a sanitary, protective shield for placement on the user's head or on/in the protective gear (e.g., helmet), or by irradiating the protective gear with antimicrobial electromagnetic waves, just to name a few.

In one embodiment, the sanitation device is a dispenser attached to either the personal transport or the docking station and is configured to dispense sanitation items. In one embodiment, the sanitation item may be any item that either deactivates microbes or contains/prevents contamination by microbes. For example, in one embodiment, the sanitation item is a single-use, disposable barrier that can be worn by the user or applied to the personal transport or protective gear such that the barrier is between the user's head and the helmet. In another embodiment, the sanitation item may be, for example, an antimicrobial wipe, spray, or packet of sanitizer, which are well known and commercially available. In one embodiment, the sanitation items are packaged in quantities to accommodate multiple users for an extended period without restocking.

In one embodiment, the sanitation device comprises a single-use hair guard dispenser 114, which includes a plurality of single-use hair guards, securely mounted to the personal transport such that a user can remove the single-use hair guard and use it in connection with a sharable helmet. In embodiments, the personal transport may be provided with helmet spray cleaner 118 securely mounted to the personal transport such that a user can remove the helmet spray cleaner 118 to clean the inside of a sharable helmet. In embodiments, the personal transport may be provided with a helmet clean wipes container 120, wherein the container contains a plurality of clean wipes, securely mounted to the personal transport such that a user can remove a clean wipe from the container 120 to clean the inside of a sharable helmet.

Figure 4:
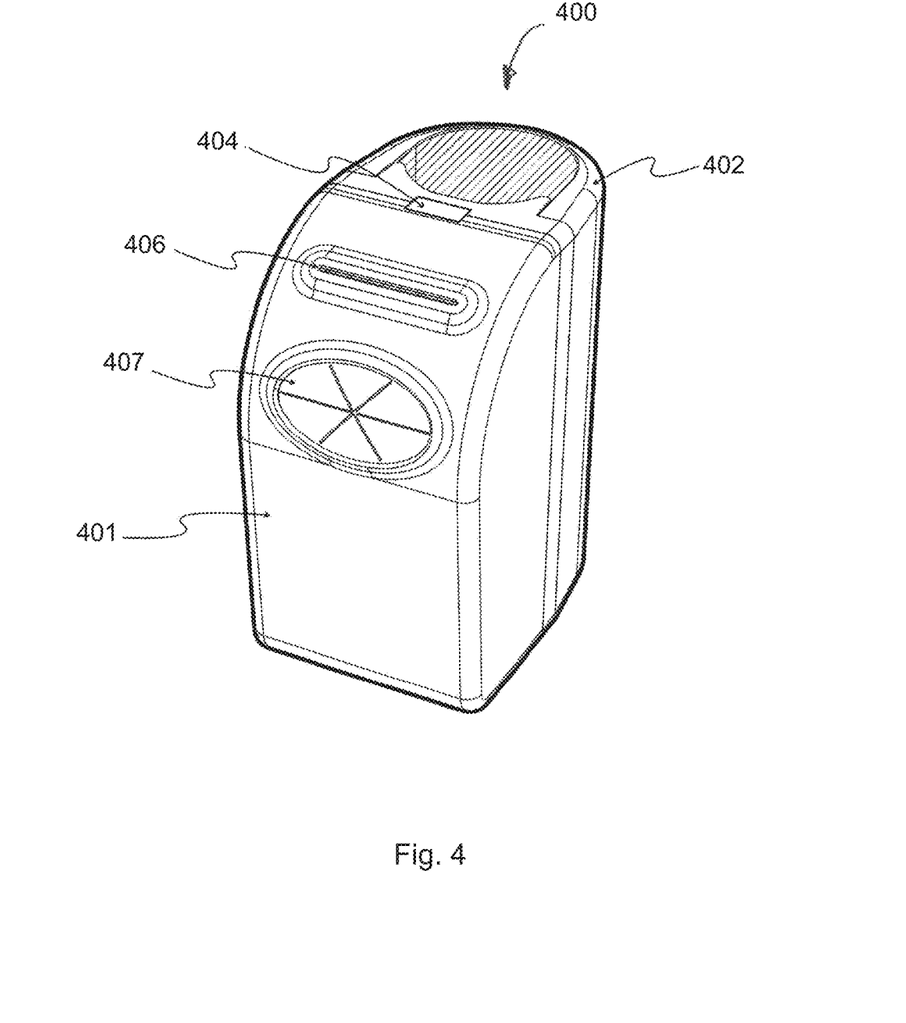
FIG. 4 shows an isometric view of one embodiment of a sanitation device comprising a sanitation item dispenser and disposal receptacle.
Figure 5:
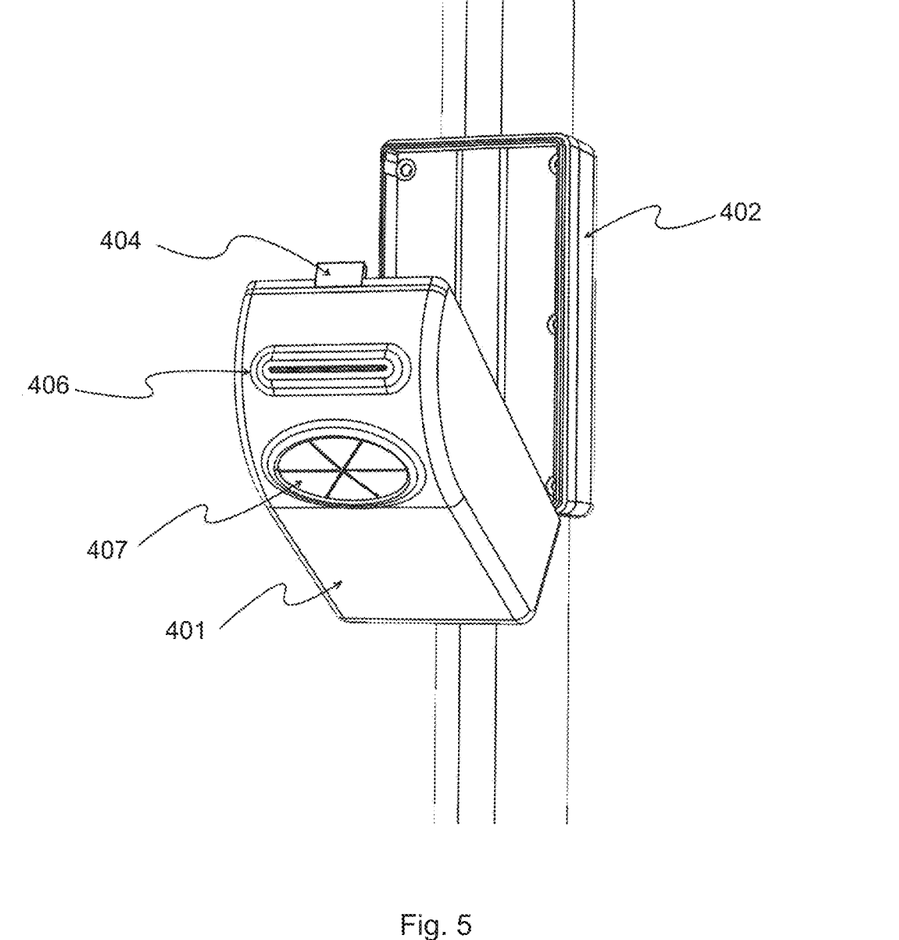
FIG. 5 shows an isometric view of the sanitation device of FIG. 4 in the open position.
Figure 6:
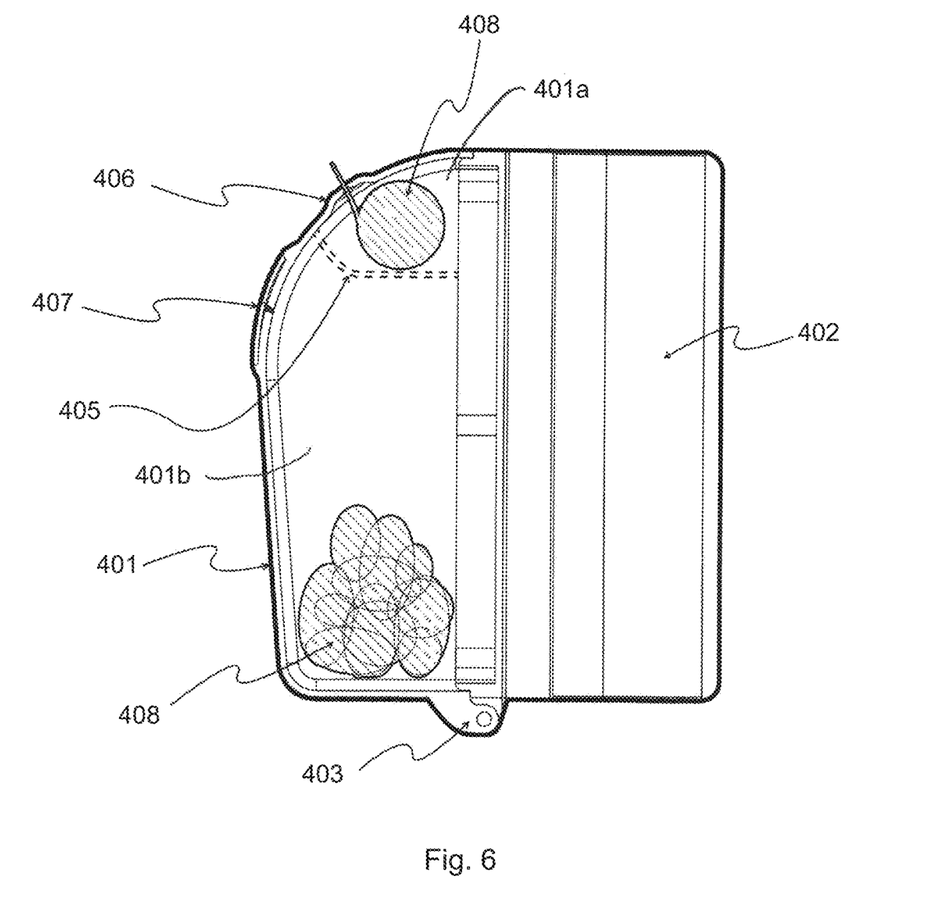
FIG. 6 shows a side cross sectioned view of the sanitation device of FIG. 4.

Referring to FIGS. 4-6, a more particular embodiment of a dispenser 400 is shown for dispensing sanitation item(s) 408. Although the dispenser 400 is illustrated herein dispensing disposable barriers, it should be understood that alternative sanitation items may be dispensed, including, for example, antimicrobial wipes or packets of sanitizer, which are well known and commercially available.

In this particular embodiment, the antimicrobial dispenser 400 comprises a container 401 with two or more isolated cavities 401*a*, 401*b* for dispensing and disposing of sanitation items 408; a mounting component 402 configured to attach to a personal transport and/or protective gear; a pivot or hinge mechanism 403 which allows the container to be opened and closed so the sanitation item(s) can be refilled or removed; a closure system 404 that allows the container to be locked; an interior cavity divider 405 to isolate clean sanitation items(s) from used sanitation items; a dispenser 406 for dispensing the sanitation item(s) 408; and a receptacle 407 for disposal of used sanitation item(s). These elements are described in greater detail below.

In one embodiment, the container 401 is an injection molded two-part housing that is durable and weather resistant to withstand various conditions and environments. Other manufacturing methods include, but are not limited to, vacuum forming, blow molding, rotationally molding or die casting. In one embodiment, the container housing material is a durable, lightweight, weather resistant and moldable plastic such as a polycarbonate, although other suitable materials may be used, such as, for example, nylon, HDPE, or a lightweight and durable die castable metal alloy such as aluminum or zinc. Still other materials will be obvious to those of skill in the art in light of this disclosure.

In one embodiment, the mounting component 402 is attached to the back half of the container housing and is configured to be attached to a surface or structure of the personal transport, although other configurations will be obvious in light of this disclosure. In one embodiment, the mounting component is configured to clamp around a post or tube of the personal transport which is then tightened to hold itself in place. The mounting component may also fit other surface profiles that include, but are not limited to round, oval, square and flat. Additional methods for mounting may include, but are not limited to, a strap, clasp, permanent adhesives, or some form of welding depending on the material. Such mounting configurations will be obvious to those of skill in the art in light of this disclosure.

In one embodiment, the sanitation device includes a pivot or hinge mechanism 403 to allow the container halves to open and close so that a user can access the interior cavities of the container to refill and or remove sanitation items without requiring the container to be completely removed from the mounting surface. Although a pivot mechanism 403 as shown in FIG. 5, it should be understood that other mechanisms may be used such as latches or resilient interconnecting members. Such mechanisms will be obvious to those of skill in light of this disclosure.

In one embodiment, the sanitation device includes a closure system 404 that securely closes and locks the container housing halves together preventing access to the interior contents of the container without specific tools and/or authorization. In one embodiment, the closure system is manually operated by use of a tool/key, but an electronic mechanical closure system by use of connected device and or motor could work as well. Other methods for the closure system will be obvious to those of skill in the art in light of this disclosure, and include, for example, a button lock, a clasp, a latch, a flange, a pin, a spring pin, or a snap.

In one embodiment, the sanitation device includes one or more dividing surfaces 405 to separate and isolate the individual cavities 401*a*, 401*b* of the container to prevent the clean sanitation items from contacting the used sanitation items. In one embodiment, the divider is part of the container housing halves but it could be an additional piece that requires assembly.

In one embodiment, the dispenser 406 for dispensing clean sanitation items for use is a simple shelf or spindle for holding/supporting a roll or stack of sanitation item(s) and a slot through which the roll is fed such that, as the user pulls one sanitation item from the slot, a second sanitation item is also pulled along with it into the slot to replace it (similar to how tissues are dispended). Alternative methods for dispensing could include, but are not limited to, a spring (similar to how napkins are dispensed), gravity, a flap, a door, a button, or an electronic motor controlled by a connected device.

In one embodiment, the disposal receptacle is a relatively large cavity in the container to enable it to hold multiple used sanitation items. In one embodiment, the opening for the disposal receptacle cavity is large enough for a user to place a used sanitation item inside by pushing the used sanitation item through a one-way door so previously-disposed items cannot fall out. In one embodiment, the sanitation device is configured to enable removal of the disposed sanitation items by a designated person with access to the container closure system.

Rather than relying on a sanitary item, such as an antimicrobial agent or a hygienic barrier, to disinfect or prevent/protect against contamination of the equipment, it may be preferable in some embodiments to irradiate the protective equipment with electromagnetic waves to eliminate microbes. Such irradiation techniques are well-known and include, for example, using ultraviolet light and even violet light to suppress/kill or otherwise deactivate microbes on the protective equipment prior to a user wearing it.

In one embodiment, the irradiation sanitation device comprises a holder for holding the protective gear and an irradiation source configured to irradiate an object held by the holder. In one embodiment, the holder is a closed container, and the irradiation source is configured to irradiate an object in the container only when the container is closed. For example, the container may be similar to the container 401, which may be attached to the personal transport or to a docking station. Such embodiment may be preferred if the radiation source is UV or laser light or other light which can be detrimental to a user's eyes. If, however, a non-harmful light is used for radiation such as certain frequencies of violet light, then the holder may not be a closed container but merely configured to hold the protective gear during the irradiation process. For example, in one embodiment, the holder comprises a clip configured to clip onto the protective gear and hold the protective gear in a predetermined orientation with respect to the irradiation source. In one embodiment, the holder and the mounting lock are one in the same. For example, in FIG. 1, the holder may be the mounting lock 104, which is configured to hold the helmet with the outer surface facing outward and the inner surface facing inward, and the irradiation source is mounted on the scooter under the helmet and configured to transmit an antimicrobial beam outward and into the interior of the helmet. In such an embodiment, the helmet may provide sufficient shielding such that a UV, laser or other potentially harmful light may be used without a closed container. In other words, the helmet may provide sufficient cover to prevent harmful light from escaping and causing eye injury. In such an embodiment, it may be preferable to have an interlock to prevent the irradiation source from operating if the helmet is not locked in place. Still other configurations of the holder will be obvious to those of skill in the art in light of this disclosure.

In one embodiment, the irradiation sanitation device is attached to the mobile device. Such a configuration is particularly practical if the mobile device is battery-operated such that the radiation source has a power supply. To that end, in one embodiment, the irradiating light source comprises one or more light-emitting diodes (LEDs), which are highly efficient and capable of operating on battery power without substantially diminishing the battery power. Alternatively, the irradiation sanitation device may have its own power supply. (Again, LED light sources can operate off of battery power for long durations.) In another embodiment, the irradiation sanitation device is attached to a docking station as described above. Given the permanency of the docking station and the likelihood of readily available power, such an embodiment facilitates the use of a powerful irradiation device. Still other embodiments of the irradiation sanitation device will be obvious to those of skill in the art in light of this disclosure.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions, and the like. The processor may be or may include a signal processor, digital processor, embedded processor, microprocessor, or any variant such as a co-processor (math co-processor, graphic co-processor, communication co-processor, and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions, and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions, and programs as described herein and elsewhere. The processor may access a non-transitory storage medium through an interface that may store methods, codes, and instructions as described herein and elsewhere. The storage medium associated with the processor for storing methods, programs, codes, program instructions, or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server, and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code, and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client, and other variants such as secondary client, host client, distributed client, and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of a program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code, and/or instructions. A central repository may provide program instructions to be executed on different devices. In this implementation, the remote repository may act as a storage medium for program code, instructions, and programs.

In embodiments, one or more of the controllers, circuits, systems, data collectors, storage systems, network elements, or the like as described throughout this disclosure may be embodied in or on an integrated circuit, such as an analog, digital, or mixed signal circuit, such as a microprocessor, a programmable logic controller, an application-specific integrated circuit, a field programmable gate array, or other circuit, such as embodied on one or more chips disposed on one or more circuit boards, such as to provide in hardware (with potentially accelerated speed, energy performance, input-output performance, or the like) one or more of the functions described herein. This may include setting up circuits with up to billions of logic gates, flip-flops, multiplexers, and other circuits in a small space, facilitating high speed processing, low power dissipation, and reduced manufacturing cost compared with board-level integration. In embodiments, a digital IC, typically a microprocessor, digital signal processor, microcontroller, or the like may use Boolean algebra to process digital signals to embody complex logic, such as involved in the circuits, controllers, and other systems described herein. In embodiments, a data collector, an expert system, a storage system, or the like may be embodied as a digital integrated circuit ("IC"), such as a logic IC, memory, chip, interface IC (e.g., a level shifter, a serializer, a deserializer, and the like), a power management IC and/or a programmable device; an analog integrated circuit, such as a linear IC, RF IC, or the like, or a mixed signal IC, such as a data acquisition IC (including A/D converters, D/A converter, digital potentiometers) and/or a clock/timing IC.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be configured for use with any kind of private, community, or hybrid cloud computing network or cloud computing environment, including those which involve features of software as a service ("SaaS"), platform as a service ("PaaS"), and/or infrastructure as a service ("IaaS").

The methods, program codes, and instructions described herein and elsewhere may be implemented on a cellular network having multiple cells. The cellular network may either be frequency division multiple access ("FDMA") network or code division multiple access ("CDMA") network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory ("RAM"); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, stand-alone RAM disks, zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the Figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure, and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f).

Persons skilled in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A rider safety compliance system, comprising:
   a physical lock mechanism securely mounted on at least one of a personal transport or a helmet, wherein the physical lock mechanism is mechanically adapted to lock and secure a helmet; and
   a user interface adapted to provide the user with information to activate the personal transport, the information comprising a verification step indicating that the user does or does not want the helmet released.

2. The rider safety compliance system of claim 1, wherein a processor on at least one of the personal transport or the helmet is adapted to control the physical lock mechanism after the user verifies that the user wants the helmet released.

3. The rider safety compliance system of claim 1, wherein the user interface requires that the user verify that the user will use a user's own helmet when riding the personal transport.

4. The rider safety compliance system of claim 1, further comprising:
   a processor adapted to release the helmet from the physical lock mechanism, wherein the user controls the processor through a software system that has granted permission to the user to activate the personal transport for temporary use.

5. The rider safety compliance system of claim 1, wherein the helmet is a foldable helmet that is compacted while stored in position on the personal transport and is unfolded to be worn by the user.

6. The rider safety compliance system of claim 1, wherein the helmet is adjustable such that it can be adjusted to fit different head sizes.

7. The rider safety compliance system of claim 1, further comprising a sensor system is adapted to record data indicative of an impact of the helmet with an object.

8. The rider safety compliance system of claim 1, further, comprising:
   a personal transport adapted with a biometric sensor, wherein the biometric sensor is pre-programmed with data indicative of a user to recognize the user based on interaction with the biometric sensor, wherein, upon user recognition based on the interaction, the personal transport activates for availability to ride.

9. The rider safety compliance system of claim 8, wherein the biometric sensor is a fingerprint sensor.

10. The rider safety compliance system of claim 8, wherein the biometric sensor is a facial recognition sensor.

11. The rider safety compliance system of claim 8, wherein the pre-programmed data is obtained through a phone of the user.

12. The rider safety compliance system of claim 1, further comprising:
    a sanitation device for facilitating hygienic use of the helmet.

13. The rider safety compliance system of claim 12, wherein said sanitation device comprising a sanitary item dispenser mounted to a personal transport and comprising at least one sanitary item comprising either an antimicrobial agent for application to the helmet, or a sanitary shield for placement between the user's head and the helmet.

14. The rider safety compliance system of claim 12 wherein said sanitation device comprises:
    a helmet spray cleaner securely mounted to a personal transport such that a user can remove the helmet spray cleaner to clean an inside of a sharable helmet.

15. The rider safety compliance system of claim 12, comprising a helmet mount, wherein the helmet mount is securely mounted on the personal transport and wherein said sanitation device comprises an irradiating source for irradiating the helmet to deactivate microbes.

16. The rider safety compliance of claim 13, wherein said sanitation device comprises:
    a helmet clean wipes container, wherein the helmet clean wipes container contains a plurality of clean wipes, securely mounted to a personal transport such that a user can remove a clean wipe from the helmet clean wipes container to clean an inside of a sharable helmet.

17. The rider safety compliance system of claim 4, wherein the processor is in communication with a phone, wherein the phone has an application adapted to locate the personal transport, communicatively connect with the processor, and unlock the helmet.

18. The rider safety compliance system of claim 17, wherein the application locates the personal transport through an electronic triangulation location of the personal transport and the phone.

19. The rider safety compliance system of claim 4, wherein the user receives a personal use code to unlock the helmet.

20. The rider safety compliance system of claim 4, wherein the user unlocks the helmet through a ride-share software application operating on a personal communication system of the user.

21. The rider safety compliance system of claim 4, wherein the processor communicates data indicative of a helmet wearing status and wherein the data is received at a server remote from the personal transport.

22. The rider safety compliance system of claim 21, wherein the data is used to generate a personal compliance profile of the user.

23. The rider safety compliance system of claim 22 wherein the personal compliance profile determines how to regulate the personal transport for the user.

24. The rider safety compliance system of claim 23, wherein a maximum capable speed of the personal transport is reduced if the personal compliance profile indicates that the user has not worn the helmet in compliance with a standard.

25. The rider safety compliance system of claim 23, wherein the personal transport de-activates if the personal compliance profile indicates that the user has not worn the helmet in compliance with a standard.

26. The rider safety compliance system of claim 23, wherein the regulation applies to a future ability of the user in using a shared personal transport.

* * * * *